United States Patent
Casey

[11] Patent Number: 6,041,658
[45] Date of Patent: Mar. 28, 2000

[54] SEAT CUSHION PRESSURE SENSING SYSTEM AND METHOD

[75] Inventor: Gary L. Casey, Thousand Oaks, Calif.

[73] Assignee: Kavlico Corporation, Moorpark, Calif.

[21] Appl. No.: 08/972,314

[22] Filed: Nov. 18, 1997

[51] Int. Cl.[7] .................................................. G01L 7/02
[52] U.S. Cl. ............................................................ 73/714
[58] Field of Search .............................. 73/714, 724, 730, 73/731, 756, 865.4, 706

[56] References Cited

U.S. PATENT DOCUMENTS

| | | | |
|---|---|---|---|
| 4,179,939 | 12/1979 | Price | 73/730 |
| 4,194,401 | 3/1980 | Claassen et al. | 73/730 |
| 4,741,214 | 5/1988 | Vidmantas | 73/724 |
| 5,024,099 | 6/1991 | Lee | 73/730 |
| 5,357,804 | 10/1994 | Wesemann et al. | 73/731 |

FOREIGN PATENT DOCUMENTS

| | | | |
|---|---|---|---|
| 2747949 | 5/1978 | Germany | 73/730 |
| 0572570 | 9/1977 | U.S.S.R. | 73/731 |
| 1436313 | 5/1976 | United Kingdom | 73/731 |

*Primary Examiner*—Robert Raevis
*Attorney, Agent, or Firm*—Oppenheimer Wolff & Donnelly LLP

[57] ABSTRACT

A method and system for sensing pressure in a seat cushion are embodied in a pressure sensing system including a bag positioned within the seat cushion and a pressure sensor which is mounted to an outer surface of the bag. The bag is filled with a fluid and includes a plurality of fluidically connected sections formed to restrict a flow of fluid between the sections. The pressure sensor includes a diaphragm and is mounted to the bag with the diaphragm being positioned against the outer surface of the bag such that the pressure sensor provides an indication of a pressure of the fluid in response to movements of the outer surface toward the diaphragm.

11 Claims, 2 Drawing Sheets

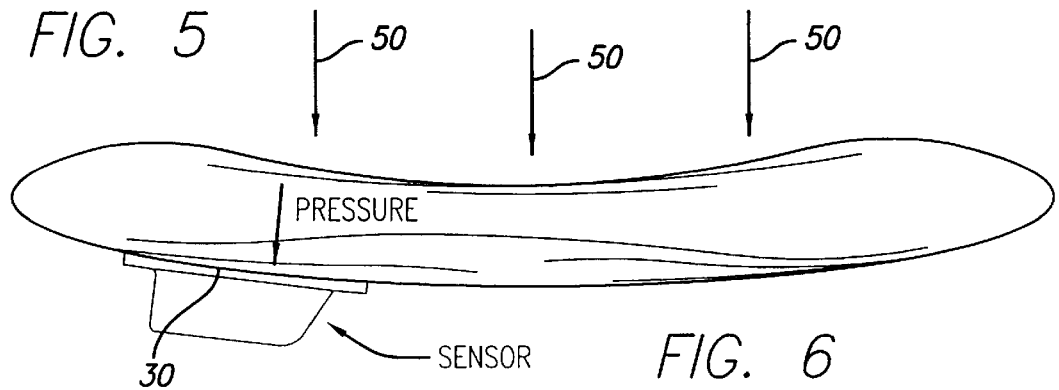
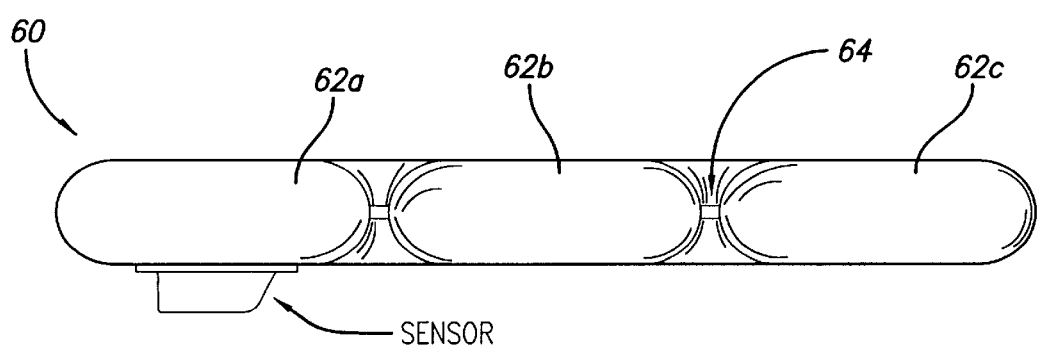
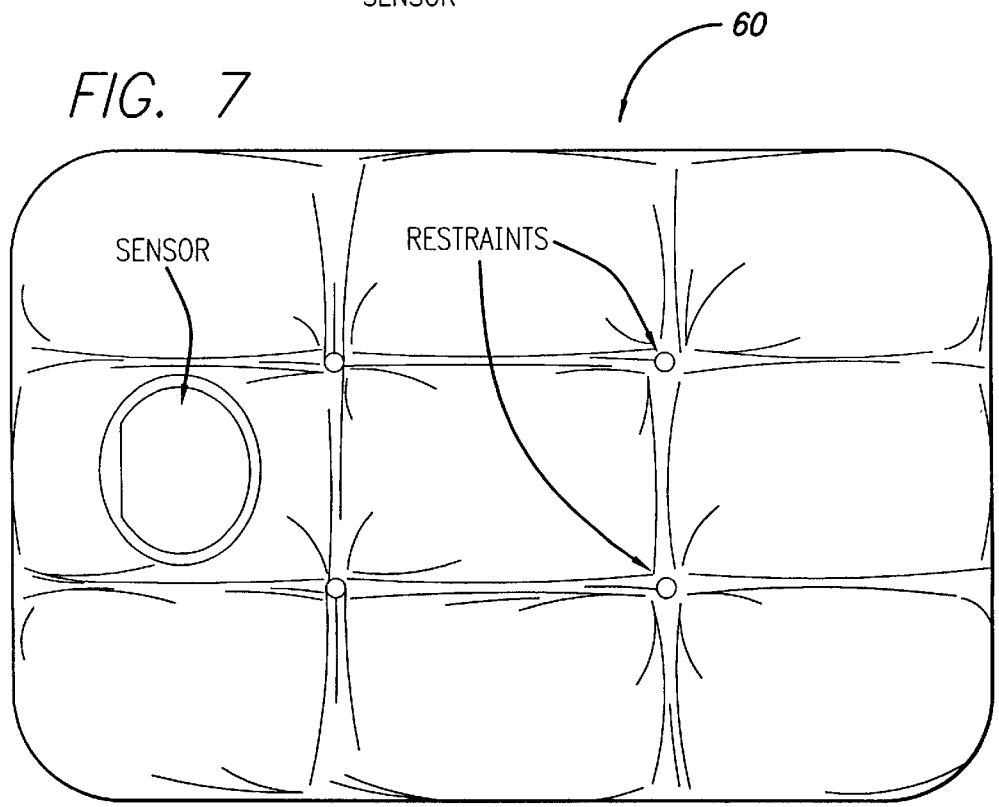

SEAT CUSHION PRESSURE SENSING SYSTEM AND METHOD

BACKGROUND OF THE INVENTION

1. Field of the Invention

The present invention relates to a pressure sensing system and method and, more particularly, pertains to a system for accurately sensing the pressure within a bag to which a pressure sensor is mounted.

2. Description of the Related Art

Vehicle inflatable restraint systems have proven to be dangerous to the occupants under certain circumstances—specifically if the occupant is of very light weight. There exists a need to detect the weight of the occupant so that the rate of inflation of the inflatable restraint can be modulated in proportion to the weight. Other methods have proven unsatisfactory from an accuracy, reliability, or cost standpoint. Some of these include costly strain gauge load cells or ultrasonic position sensors (assumes that the distance from the dash is proportional to weight). Other conventional methods require a pressure port and tube, which are sources for potential leakage.

Thus, there is a need for a system and method for accurately, reliably and affordably measuring the internal pressure of a liquid or air-filled bag positioned within a seat in a vehicle and for providing an indication of the weight of the occupant positioned over the seat.

SUMMARY OF THE INVENTION

In accordance with a specific illustrative embodiment of the present invention, a pressure sensing system includes a bag with a plurality of fluidically connected sections and a pressure sensor. The bag is substantially filled with a liquid; and the pressure sensor includes a diaphragm. The pressure sensor is mounted to an outer surface of the bag with the diaphragm being positioned against the outer surface such that the pressure sensor provides an indication of a pressure of the fluid in response to movements of the outer surface toward the diaphragm.

In another aspect of the present invention, a pressure sensing system includes a bag and a pressure sensor. The bag is substantially filled with a liquid and includes an outer surface. The pressure sensor includes a diaphragm and as mounted to the outer surface of the bag with the diaphragm being positioned against the outer surface such that the pressure sensor provides an indication of a pressure of the fluid in response to movements of the outer surface against the diaphragm.

In another aspect of the present invention, a pressure sensing system includes a membrane and a pressure sensor. The membrane has an inner surface positioned against a fluid and an outer surface. The pressure sensor includes a diaphragm and as mounted to the outer surface of the membrane with the diaphragm being positioned against the outer surface such that the pressure sensor provides an indication of a pressure of the fluid in response to movements of the outer surface against the diaphragm.

In another aspect of the present invention, a method for measuring pressure includes the steps of providing a bag with a plurality of sections, the bag including restraints which restrict a flow of fluid between the sections; substantially filling the bag with the fluid; and positioning a pressure sensor with a diaphragm against the bag such that the pressure sensor provides an indication of a pressure of the fluid in response to movements of the bag against the diaphragm.

In another aspect of the present invention, a method of measuring pressure includes the steps of: positioning a membrane in contact with the fluid; and positioning a pressure sensor with a diaphragm against the membrane such that the pressure sensor provides an indication of a pressure of the fluid in response to movements of the membrane against the diaphragm.

BRIEF DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 5 is a side view of the pressure sensor system of FIG. 1 showing vectors indicative of a direction of forces applied thereto;

FIG. 6 is a sectional side view of an exemplary alternative preferred embodiment of the pressure sensing system which includes a bag with a plurality of sections defined by restraints; and FIG. 7 is a bottom view of the pressure sensing system of FIG. 6.

DETAILED DESCRIPTION OF THE PREFERRED EMBODIMENTS

Figure 1:
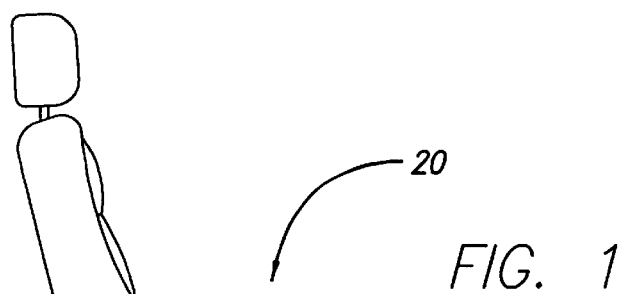
FIG. 1 is a cross-sectional view of an exemplary preferred embodiment of the pressure sensing system according to the present invention positioned within the cushion of a seat.
Figure 2:
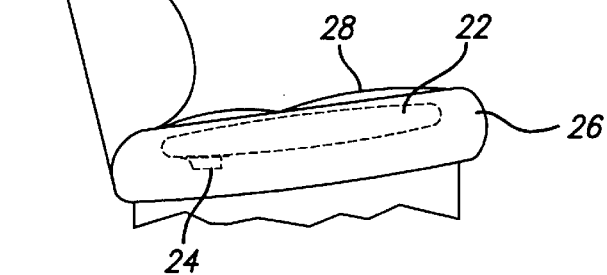
FIG. 2 is a cross-sectional view of a pressure sensor according to the present invention.
Figure 4:
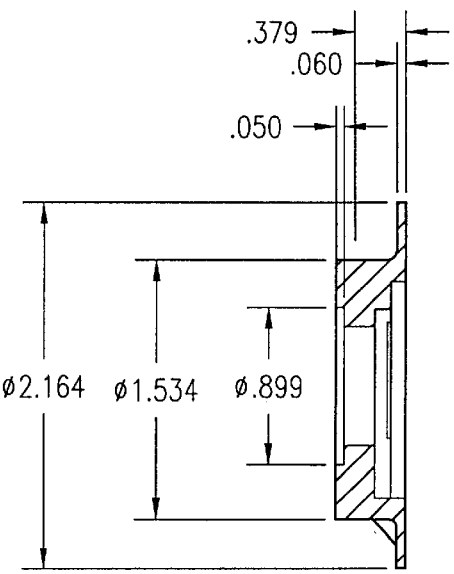
FIG. 4 is a sectional view along lines B—B of FIG. 2.

As shown in FIG. 1, a pressure sensing system 20 includes a bag 22 and a pressure sensor 24 positioned within the cushion 26 of a seat in a vehicle. Preferably, the bag 22 is an integral part of the seat cushion 26 and is positioned just below the upper surface 28 of the cushion 26. The pressure sensor 24 is preferably positioned on the underside of the bag 22 as shown. The remainder of the cushion 26 includes conventional springs, foam cushioning and the like assembled such that the "feel" of the seat remains unaltered or substantially unaltered by the introduction of the pressure sensing system 20 therein.

As shown in FIG. 1, the bag 22 is sufficiently thin and large enough in area to cover substantially all the seating area of the cushion 26. The bag 22 is filled or substantially filled with a liquid, typically air or a silicone oil, at a relatively low initial pressure—essentially zero—so that the bag 22 has little or no influence on the comfort of the seat. It has been found that a relatively heavy occupant imparts a pressure in the bag in the range of 1.5 to 5.0 psig depending on the design of the bag. The pressure in the bag 22 has also been found to be relatively independent of the position of the occupant on the cushion 26.

Figure 3:
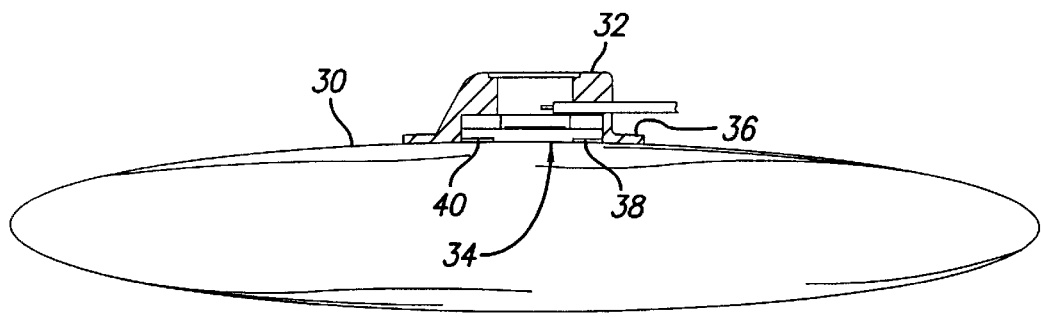
FIG. 3 is a sectional view along lines A—A of FIG. 2.

The bag 22 preferably comprises of a leak-proof fabric impregnated with urethane rubber. As best shown in FIG. 3, the bag 22 includes an outer surface 30 to which the pressure sensor 24 is mounted. The pressure sensor 24 includes a housing 32 and a diaphragm 34 fitted within the housing 32. The housing 32 preferably comprises a rubber material and is secured to the outer surface 30 such that the diaphragm 34 is positioned against the outer surface 30. The pressure sensor 24 is preferably capacitive and provides an indication of a pressure of the fluid in the bag 22 in response to movements of the bag 22 against the diaphragm 34. An exemplary pressure sensor which illustrates the concepts associated with employing a flexible diaphragm to sense pressure is described in U.S. Pat. No. 5,233,875 to Obermeier et al., the contents of which are incorporated herein by reference.

A key aspect of the present invention is that the housing 32 is mounted to the bag 22 such that the force-sensitive, flexible diaphragm 34 with a relatively large "active area" is held against the bag 22. By the use of a relatively large sensor diaphragm 34—in the order of 0.84 to 1.25 inches diameter—it has been determined that the sensor can detect the bag pressure through the bag surface itself. The pressure sensor diaphragm 34 must be placed against the bag membrane in such a way that the membrane lies flat against the diaphragm, therefore transmitting only the pressure within the bag and not the pressure-induced tension forces in the bag itself. This method eliminates any possibility of the pressure sensor 24 causing any bag leakage.

The diaphragm 34 is positioned against the outer surface 30 of the bag 22 in several possible ways. Preferably, the diaphragm 34 is fitted within the housing 32 and a periphery portion 36 of the housing 32 is thermally welded to the bag 22 or secured thereto with a conventional adhesive. The attachment around the periphery portion 36 need not be hermetically sealed, just mechanically strong. Alternatively (or additionally), the outer edge, the "non-active" area of the diaphragm 34, is secured to the bag 22 with a conventional adhesive or is secured between the bag 22 and the periphery portion 36. The pressure sensor 24 additionally includes a sensor/hybrid assembly 38 which is separated from the diaphragm 34 by a glass frit 40 or other insulative material.

In an exemplary preferred embodiment, the sense element or "active area" of the diaphragm 34 is 1.25 inches diameter and the frit 40 is approximately 0.12 inches wide, leaving an effective diaphragm diameter of 1.10 inches. As discussed above, the housing 32 is made from a material that is compatible with the adhesion method to the bag 22, typically urethane rubber.

The function of the pressure sensor system 20 depends on the membrane qualities of the bag material. A "perfect" membrane will not sustain shear forces—only tension. Therefore, if the bag material is attached to the nominally rigid housing around the periphery, the material in the center is substantially flat. Therefore, the only support that resists the internal pressure in the bag is the sensor diaphragm itself, and since the required deflection of the sensor diaphragm is very small (approximately 0.0005 inches) compared to the nominal 1.0 inch diaphragm active diameter, the total force exerted on the diaphragm will be virtually identical to the force that would have been exerted by the pressure of the liquid itself, without the bag 22 being present.

Referring to FIG. 5, the weight of the occupant is conceptually illustrated by force vectors 50 and is distributed over the bag 22 in such a way that the pressure of the fluid in the bag is a function of the weight of the occupant. Electronics within the sensor/hybrid assembly 38 provide an indication of a pressure of the fluid in response to movements of the outer surface 30 against the diaphragm 34. More specifically, the electronics provide an indication of a pressure of the fluid in response to movements of the outer surface 30 against the diaphragm 34 along an axis 50 (FIG. 3) substantially normal to the diaphragm 34. Exemplary electronics are disclosed in U.S. Pat. No. 5,233,875 to Obermeier et al., the contents of which are incorporated herein by reference.

The pressure sensor 24 provides a signal that has a known relationship to the weight of the occupant. As may be readily appreciated, this relationship depends upon a number of design considerations and is not necessarily linear, but in most instances is monotonic. Data representing the aforementioned known relationship is empirically derived and used by an Electronic Control Unit (ECU) of a processor in a vehicle. The ECU interprets the signal provided by the pressure sensor 24 and determines the correct implementation of the inflatable restraint.

A conventional method of determining the pressure would be to connect a hose to the bag with a fitting and then connect a pressure sensor to the hose. However, in order for a pressure sensor system to be effective over the life of the vehicle, the possibility of leakage must be kept to the absolute minimum. Another key aspect of the present invention is that such hoses (sources of potential leakage) are eliminated.

Further with regard to system leakage, it should be appreciated that even a small leakage will eventually make the system inoperative. The fact that the present invention eliminates unnecessary hoses and employs a leak-proof bag substantially eliminates this possibility.

The alternative embodiment illustrated in FIGS. 6 and 7 embodies a further refinement of the present invention. These figures show an alternative bag 60 that is particularly designed to compensate for uneven distributions of weight over the bag 60. The illustrated bag 60 is formed in such a manner that a flow of fluid between a plurality of sections 62 of the bag 60 is restricted. More specifically, the bag includes at least one restraint 64 positioned across the bag 60. Exemplary preferred restraints 64 pull opposing sides of the bag 60 together as best shown in FIG. 6. The restraints 64 define the sections 62 and limit a flow of fluid between the sections 62. By way of example, the restraints 64 restrict, limit, or at least slow a flow of liquid from section 62a into sections 62b and 62c when the weight of the occupant is concentrated over section 62a. Other bag configurations, such as those employed in modern water beds, are contemplated as being within the scope of the present invention.

In conclusion, it is to be understood that the foregoing detailed description and the accompanying drawings illustrate the principles of the invention. However, various changes and modifications may be employed without departing from the spirit and scope of the invention. Accordingly, the present invention is not limited to the specific form shown in the drawings and described in detail hereinabove.

What is claimed is:

1. A pressure sensor system comprising:
    a bag substantially filled with a fluid, said bag including an outer surface; and
    at least one pressure sensor including a diaphragm, said pressure sensor being mounted to said outer surface with said diaphragm being positioned against said outer surface such that said pressure sensor directly measures the pressure of said fluid without physically contacting said fluid;
    said pressure sensor being a capacitive pressure sensor with said diaphragm having a central area which deflects relative to the periphery of said diaphragm with varying pressure applied to said diaphragm, to change the capacitance of the sensor;
    said bag having predetermined areas of the surface thereof which are substantially flat, and said sensor being coupled to said bag with said diaphragm being in engagement with one of said predetermined areas;

said sensor being coupled to provide an output indication of the deflection of the diaphragm corresponding to the pressure level in said bag; and said sensor being securely bonded to said bag around the periphery of said diaphragm, wherein changes in pressure within the bag will not change the area of the bag secured to said sensor.

2. The pressure sensing system of claim 1 wherein said bag is made up of a plurality of fluidically connected sections.

3. The pressure sensing system of claim 2 wherein said system further comprises at least one restraint positioned across said bag defining said sections.

4. The pressure sensor system of claim 1 wherein said pressure sensor comprises:

an outer housing circumscribing said diaphragm, within which said diaphragm is secured, said outer housing being securely bonded to said outer surface of said bag.

5. The pressure sensor system of claim 1 wherein the periphery of said diaphragm is securely bonded to said bag with an adhesive.

6. The pressure sensor system of claim 1 wherein said outer housing is securely bonded to said bag with a thermal weld.

7. The pressure sensor system of claim 1 wherein said diaphragm has a substantially circular active area with a diameter of no less than 0.25 inches.

8. The pressure sensor system of claim 1 wherein said pressure sensor is a substantially planar capacitive pressure sensor.

9. The pressure sensor system of claim 1 wherein said bag has a thickness between 5 and 15 mils.

10. The pressure sensor system of claim 1 wherein said diaphragm has a thickness between 8 and 12 mils.

11. A pressure sensor system comprising:

a container substantially filled with fluid, said container including a flexible outer surface; and at least one pressure sensor including a diaphragm, said pressure sensor being mounted to said outer surface with said diaphragm being positioned against said outer surface such that said pressure sensor directly measures the pressure of said fluid without physically contacting said fluid;

said pressure sensor diaphragm having a central area which deflects relative to the periphery of said diaphragm with varying pressure applied to said diaphragm to change the output of the sensor;

said container having predetermined areas of the surface thereof which are substantially flat, and said sensor being coupled to said container with said diaphragm being in engagement with one of said predetermined areas;

said sensor being coupled to provide an output indication of the deflection of the diaphragm corresponding to the pressure level in said container; and said sensor being in firm engagement with said container around the periphery of said diaphragm, thereby permitting direct measurement of said pressure by said sensor.

* * * * *